(12) United States Patent
Sauma Vargas et al.

(10) Patent No.: US 12,020,057 B2
(45) Date of Patent: Jun. 25, 2024

(54) HITLESS CONTAINER UPGRADE WITHOUT AN ORCHESTRATOR

(71) Applicant: HEWLETT PACKARD ENTERPRISE DEVELOPMENT LP, Houston, TX (US)

(72) Inventors: Jorge Arturo Sauma Vargas, Heredia (CR); Francisco José Rojas Fonseca, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 417 days.

(21) Appl. No.: 17/378,583

(22) Filed: Jul. 16, 2021

(65) Prior Publication Data

US 2023/0017295 A1    Jan. 19, 2023

(51) Int. Cl.
  *G06F 9/455*     (2018.01)
  *G06F 9/48*      (2006.01)
  *G06F 11/20*     (2006.01)

(52) U.S. Cl.
  CPC ........ *G06F 9/45558* (2013.01); *G06F 9/4856* (2013.01); *G06F 11/2069* (2013.01); *G06F 2009/45562* (2013.01); *G06F 2009/4557* (2013.01); *G06F 2009/45579* (2013.01)

(58) Field of Classification Search
  None
  See application file for complete search history.

(56) References Cited

U.S. PATENT DOCUMENTS

| | | | |
|---|---|---|---|
| 8,171,466 B2 | 5/2012 | Langen et al. | |
| 9,594,590 B2 | 3/2017 | Hsu | |
| 2014/0082156 A1* | 3/2014 | Jagtap | G06F 9/5027 709/220 |
| 2016/0212237 A1* | 7/2016 | Nishijima | G06F 9/45558 |
| 2017/0093923 A1* | 3/2017 | Duan | G06F 11/2028 |
| 2018/0167217 A1* | 6/2018 | Brady | H04L 67/10 |
| 2018/0246715 A1 | 8/2018 | Regmi et al. | |

(Continued)

OTHER PUBLICATIONS

Kubernetes; "Performing a Rolling Update"; https://kubernetes.io/docs/tutorials/kubernetes-basics/update/update-intro/; Feb. 4, 2020; 5 pgs.

(Continued)

*Primary Examiner* — Umut Onat
(74) *Attorney, Agent, or Firm* — Sheppard Mullin Richter & Hampton LLP

(57) ABSTRACT

Systems, methods, and computer-readable media are disclosed for performing a hitless upgrade of executable code in the absence of an orchestrator or other upgrade manager. A mechanism is disclosed that utilizes containers to update software functionality, features, or the like without interrupting a service provided by a container and without relying on an orchestrator or other upgrade manager to coordinate the upgrade process. State information indicative of a current state of module(s) within a container is maintained in an external data store such as a state database. A hand-off from a current container to a new container that updates module code/functionality of the current container can be initiated upon determining that a state metric calculated by the old container at a future timestamp matches a state metric independently calculated by the new container at the same timestamp.

18 Claims, 5 Drawing Sheets

(56) References Cited

U.S. PATENT DOCUMENTS

2019/0340282 A1* 11/2019 Zimmermann ........ G06Q 10/06
2021/0049002 A1* 2/2021 Myers .................... G06F 8/656

OTHER PUBLICATIONS

Oh, S., et al.; "Stateful Container Migration employing Checkpoint-based Restoration for Orchestrated Container Clusters"; 2018 International Conference on Information and Communication Technology Convergence (ICTC); Oct. 17-19, 2018; pp. 25-30; IEEE.

* cited by examiner

HITLESS CONTAINER UPGRADE WITHOUT AN ORCHESTRATOR

DESCRIPTION OF RELATED ART

Software upgrades are a routine occurrence for information technology (IT) systems in a wide range of industries. A software upgrade may be performed for a variety of reasons including to fix a bug, implement new functionality, improve system security, or the like. In recent years, containers have been widely adopted due to their flexibility, modularity, and scalability in deploying executable code. A particular type of upgrade is a container upgrade in which a current container is replaced with a new container, which does not require restarting the operating system.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
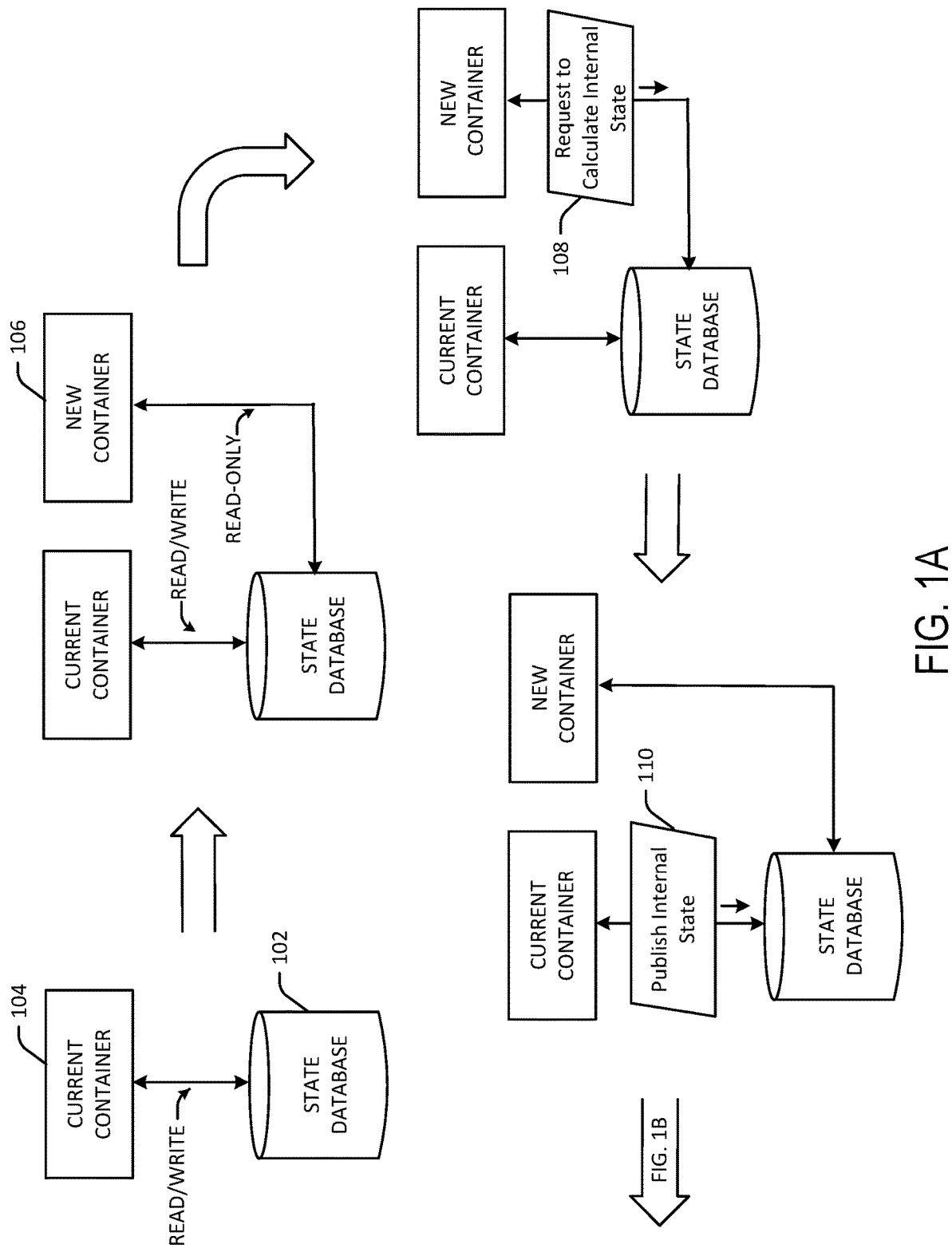
FIGS. 1A and 1B are schematic diagrams illustrating a hitless container upgrade in the absence of an orchestrator according to example embodiments of the disclosed technology.

The figures are not exhaustive and do not limit the present disclosure to the precise form disclosed.

DETAILED DESCRIPTION

Many industries rely on frequent software upgrades to ensure that the latest version of a specific component is installed. Moreover, in many industries such in the healthcare industry where software systems often play a critical role in administering life-saving care, it is imperative that the upgrades be performed with very little system downtime. Thus, it is desirable for software upgrades to be performed in a hitless manner, i.e., without interrupting a service implemented by the component being upgraded. While a hitless upgrade may be possible in systems without constrained resources through the use of an orchestrator, in systems with constrained resources, such as an embedded device, a network switch, or the like, the use of an orchestrator or other upgrade manager is likely not possible. Further, while virtual machines may be used in lieu of containers to implement a software upgrade mechanism, devices with constrained resources do not have the processing capacity or memory to run a virtual machine.

Embodiments of the disclosed technology provide a technical solution to the technical problem of performing frequent upgrades in a resource-constrained environment while still achieving low downtimes. This technical solution is provided in the form of a hitless upgrade mechanism that does not require an orchestrator or other type of upgrade manager, and thus, can be performed in a resource-constrained environment. Therefore, this technical solution represents a technological improvement over conventional upgrade mechanisms, particularly with respect to resource-constrained systems such as embedded devices.

Containers have been widely adopted in recent years due to their flexibility, modularity, and scalability. Generally speaking, a container is a modular unit that packages up executable code and its dependencies such that the container can be installed in different computing environments and the code contained therein can be reliably executed in the different computing environments. A benefit of containers over virtual machines, for example, is that they allow for greater modularity. For instance, rather than running an entire application inside a single container, the application can be split into modules (e.g., a database module, a front-end module, etc.) as part of a microservices approach. The modularity of containers is particularly useful in complex systems because it allows for the system's state to be maintained independently of the processing performed by executable code within the container. A container has the further benefit in that it can be replaced with a new container that includes an update/upgrade to one or more modules in the container without necessitating a restart of the operating system. Embodiments of the disclosed technology build on this modular/replaceable characteristic of containers by providing systems, methods, computer-readable media, techniques, processes, or methodologies for upgrading executable code/functionality within a container via a hitless container replacement that does not interrupt the service(s) being implemented by the container.

In some embodiments, the hitless upgrade mechanism is used to update a feature (also referred to herein as a module) running within a container with a newer version of that module/feature running in a different container. A module/feature refers to a collection of computer-executable instructions/code that performs one or more specific services responsive to execution by a processor. A container that includes a module being updated is referred to herein as the current container or the old container, and a container that will replace the current container with a newer version of the module is referred to herein as the new container. In some embodiments, module(s) within a container are stateless, meaning that the system's state is stored outside of the container. That is, an internal state of a container (e.g., state information for the one or more modules in the container) is stored in an external environment such as within an external state data store. The state data store may be referred to herein as a state database, however, it should be appreciated that any form of storage external to the container can be used to store state information. In some embodiments, a module running inside a container may have an internal cache that stores state information for the module, but the current state can nevertheless be reconstructed from only the state information stored outside the container.

Figure 1B:
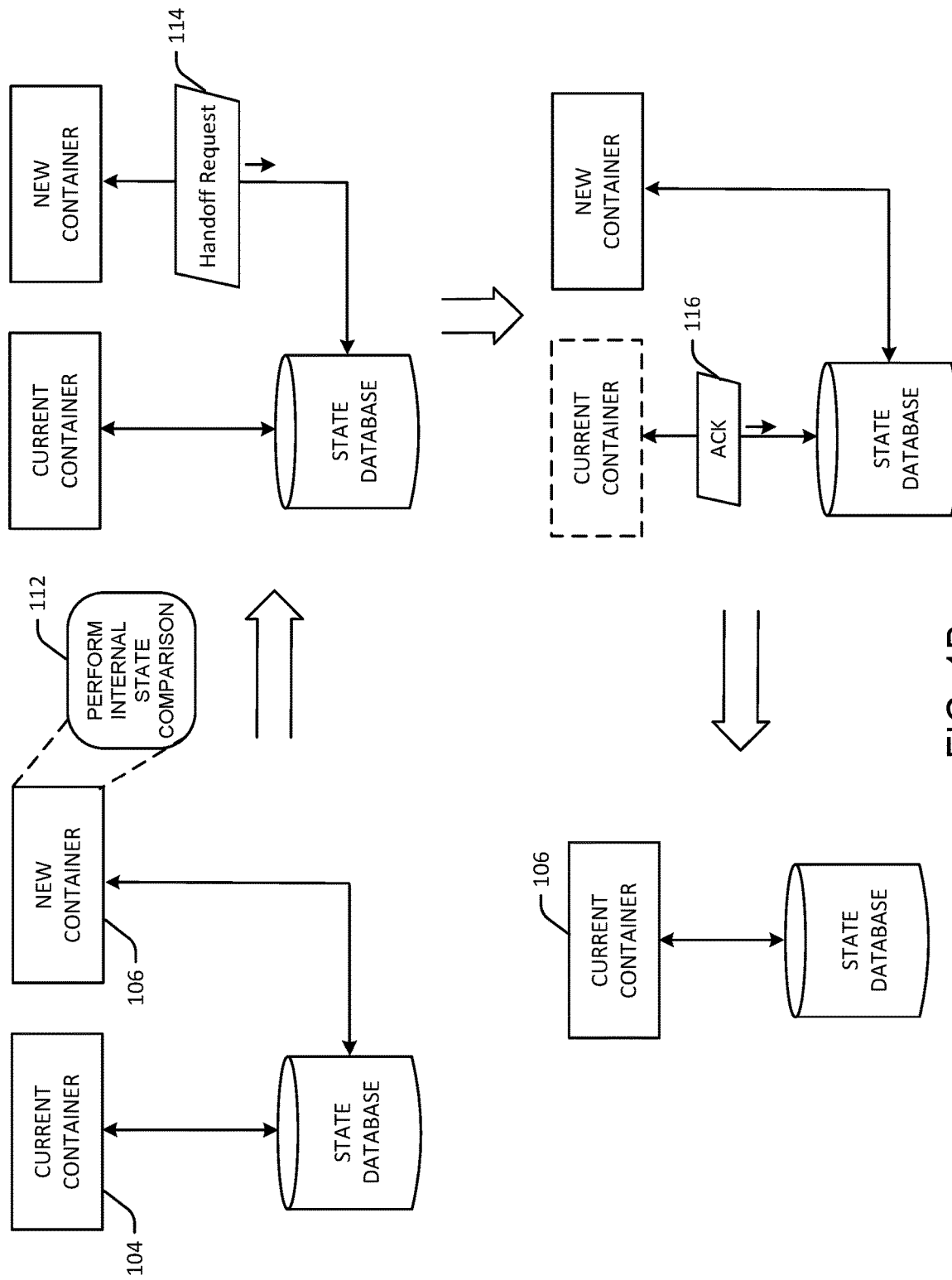

FIGS. 1A and 1B are schematic diagrams illustrating a hitless container upgrade in the absence of an orchestrator according to example embodiments of the disclosed technology. FIG. 3 is a flow diagram illustrating a set of executable instructions stored in machine-readable storage media that, when executed, cause a hitless container upgrade to be performed in the absence of an orchestrator according to example embodiments of the disclosed technology. FIGS. 1A, 1B, and 3 will be described in conjunction with one another hereinafter, with occasional reference to FIG. 2, which is a block diagram of a container according to example embodiments of the disclosed technology.

FIG. 3 depicts a computing component 300 that includes one or more hardware processors 302 and machine-readable storage media 304 storing a set of machine-readable/machine-executable instructions that, when executed, cause the hardware processors 302 to perform an illustrative hitless container upgrade method schematically depicted in FIGS. 1A and 1B. The computing component 300 may be, for example, the computing system 400 depicted in FIG. 4. In some example embodiments, the computing component 300 may be an embedded device (e.g., a network switch, a network router, etc.); an edge computing device such as a desktop computer, a laptop computer, a tablet computer/device, a smartphone, a personal digital assistant (PDA), a wearable computing device, a gaming console; or another type of device with potentially constrained resources. In other example embodiments, the computing component 300 may be a server, a server cluster, or the like. The hardware processors 302 may include, for example, the processor(s) 404 depicted in FIG. 4 or any other processing unit described herein. The machine-readable storage media 304 may include the main memory 406, the read-only memory (ROM) 408, the storage 410, or any other suitable machine-readable storage media described herein.

In example embodiments, the instructions depicted in FIG. 3 as being stored on the machine-readable storage media 304 may be modularized into one or more computing engines. In particular, each such computing engine may include a set of machine-readable and machine-executable instructions, that when executed by the hardware processors 302, cause the hardware processors 302 to perform corresponding tasks/processing. In example embodiments, the set of tasks performed responsive to execution of the set of instructions forming part of a particular computing engine may be a set of specialized/customized tasks for effectuating a particular type/scope of processing. These engines can be implemented in any combination of hardware, software, and/or firmware. In some embodiments, these engines may be customized computer-executable logic implemented within a customized computing machine such as a customized field programmable gate array (FPGA) or an application specific integrated circuit (ASIC).

Referring first to FIG. 1A, a current container 104 is depicted. The current container 104 may include executable code and/or functionality, which may be packaged into one or more modules. In some embodiments, a module executes inside the container 104, but a state of the system in which the container 104 is running and a state of the module itself are stored outside the container 104. In particular, in some embodiments, the state information is stored in an external state database 102. The module running in the container 104 reads its state information from the state database 102 and updates the state information stored in the state database 102 as necessary. Thus, the current container 104 has both read and write capability with respect to the state database 102. Because the system/module state is stored outside the container 104, even if the container 104 ceases to exist (e.g., the container 104 is replaced), the state is preserved. State information may include information pertaining to the state of a particular module within a container, information pertaining to the state of the container itself, and/or information performing to the state of a system on which the container is installed. Container state information may indicate, for example, whether the container is actively running, whether the container has read/write capability or read-only capability, whether the container is waiting for an output from another container/process, or the like.

Figure 2:
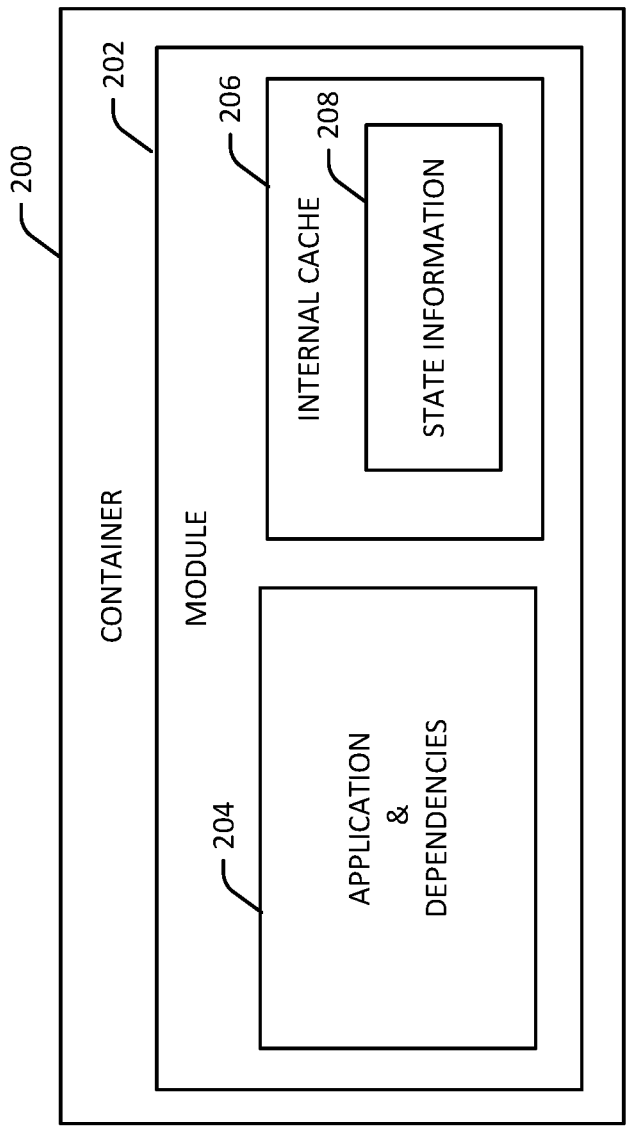
FIG. 2 is a block diagram of a container according to example embodiments of the disclosed technology.
Figure 3:
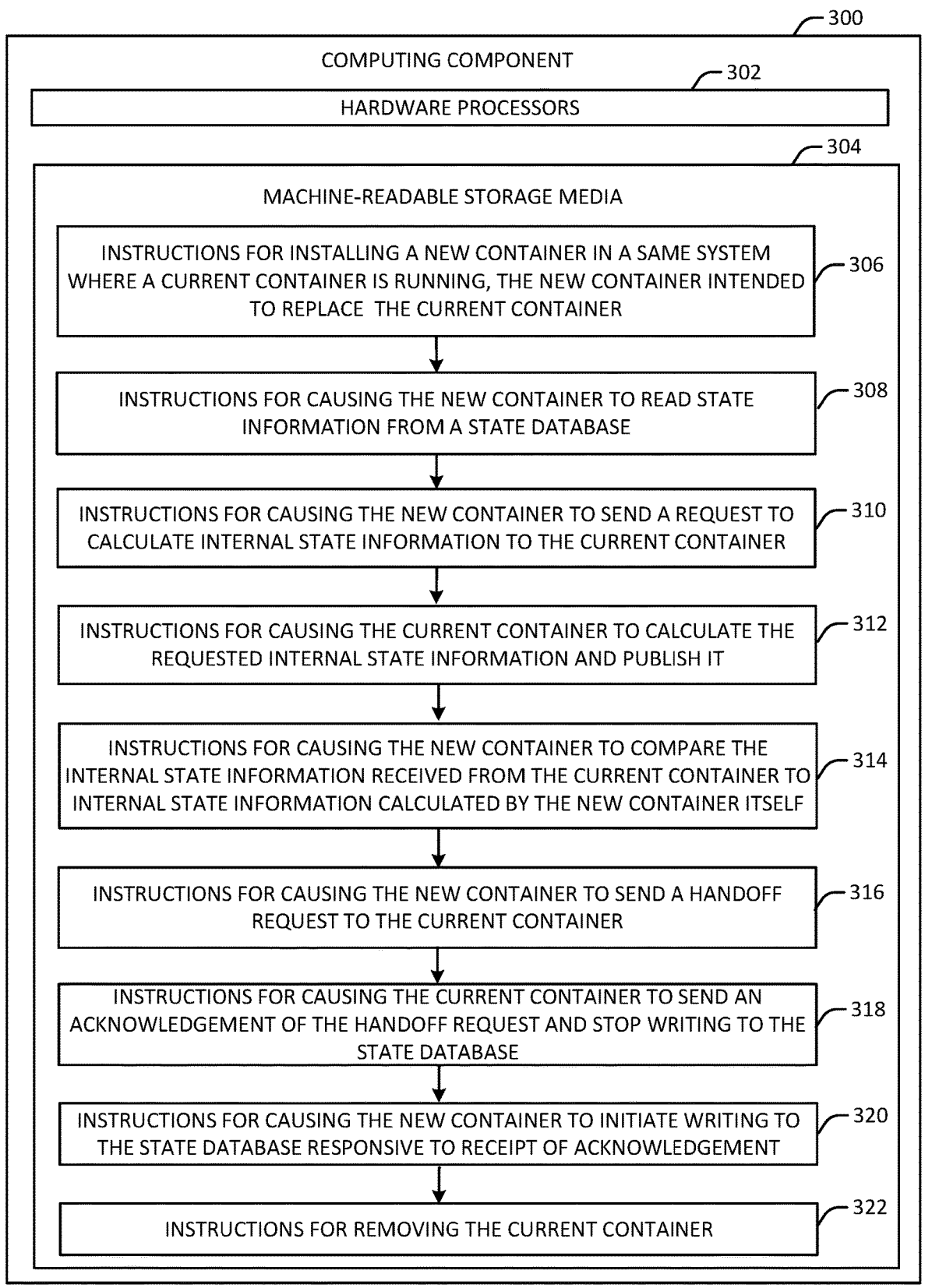
FIG. 3 is a flow diagram illustrating a set of executable instructions stored in machine-readable storage media that, when executed, cause a hitless container upgrade to be performed without an orchestrator according to example embodiments of the disclosed technology.

In some embodiments, the current container 104 may have the example container structure 200 shown in FIG. 2. The container structure 200 includes a module 202. While a single example module 202 is depicted, it should be appreciated that the container structure 200 may include multiple such modules forming part of a larger application. Each module 202 may include a portion of the application's code that relates to one or more related services (e.g., a module containing database functionality). The module 202 includes application code and dependencies 204. The application code may include computer-executable code and/or functionality relating to one or more services provided by the module 202. The dependencies may include, for example, libraries, configuration files, specific versions of programming language runtimes, binaries, or any other dependency that may be needed to run the application code. In this manner, the container structure 200 provides a self-contained environment for the module 202 that includes all dependencies needed to run the application code.

The module 202 further includes an internal cache 206. In some embodiments, the internal cache 206 may store state information 208. The state information 208 may include one or more metric values indicative of a state of the module 202. As noted earlier, however, even though the internal cache 206 may store the state information 208, the state information 208 is also maintained outside of the container 200 in an external environment such as a state database 102 such that the module's state is preserved even if the container 200 is deleted. In some embodiments, a state machine may store and manage various container states, which may be distinct from the states of modules contained within the containers. For instance, the state machine may indicate which containers are current containers with actively running module(s) and thus authorized to update module state information stored in the state database 102 and which containers are new containers that have read-only access to the state database 102 until the container upgrade is complete and the new containers replace the existing current containers.

Referring now to FIG. 3 in conjunction with FIG. 1A, at block 306, machine-executable instructions may be executed by the processor(s) 302 to cause a new container 106 to be installed in the same system in which the current container 104 is running. In some embodiments, the new container 106 will read the system/module state information from the stare database 102 and catch-up to the current state. The new container 106, however, does not yet have write capability with respect to the state database 102 at this stage in the hitless container upgrade process. Thus, even as it begins processing events, the new container 106 cannot update the state stored in the state database 102. In particular, the current container 104 continues to have read/write capability for the state database 102, and thus, continues to both read and update the state information, but the new container 106 only reads the state information from state database 102 in order to bring its state to that of the current container 104, but cannot change the state information. In some embodiments, a container may be validated with a digital signature prior to installation.

In some embodiments, the current container 104 may write to the state database 102 to update respective state information for multiple modules contained in the current container 104. Further, in some cases, changes in the state of one module may impact the state of another module. As such, updates to the state information for a given module may cause an update to the state information for one or more other modules to be made. In some embodiments, an initial informal state verification may be performed at this stage. More specifically, the new container 106 may verify the accuracy of its processing by comparing its state with updates that the current container 104 makes to the state information in the state database 102. This may constitute a preliminary verification mechanism that serves as a precursor to a more formal state verification mechanism that involves calculating internal state values, as will be described in more detail hereinafter.

Referring still to FIG. 3 in conjunction with FIG. 1A, at block 308, machine-executable instructions may be executed by the processor(s) 302 to cause the new container 106 to read state information from the state database 102. In particular, the new container 106 may read a system state and/or a module state for each of one or more modules in the new container 106 and begin processing events based on the state information to bring its state up to that of the current container 104.

At block 310, machine-executable instructions may be executed by the processor(s) 302 to cause the new container 106 to send a request 108 to the current container 104 to calculate internal state information. In some embodiments, the new container 106 may send the request 108 for the internal state information to the current container 104 through the state database 102 or through another third party device/module. In such embodiments, each container may update its state during the container upgrade process so that each container can read the state of the other container and act accordingly. In some embodiments, the containers may directly communicate with one another. In those embodiments according to which containers communicate directly, they may need to open communication ports and utilize a communication protocol such as a Representational state transfer (RESTful) interface.

At block 312, machine-executable instructions may be executed by the processor(s) 302 to cause the current container 104 to calculate the requested internal state information and publish 110 the calculated information. In some embodiments, the internal state information includes a calculated internal state (CIS) metric. In some embodiments, the CIS metric is a hash of a set of internal values representative of an internal state of a module contained within a container. The CIS metric may serve as a mechanism to verify that the new container 106 is performing the same functionality as the current container 104 and that the system will not be affected by the container upgrade. In some embodiments, the CIS metric may be based on a relatively static set of internal values in order to mitigate the possibility that the new container 106 has a different state for a module than the current container 104 does when the new container 106 replaces the current container 104. For instance, the current container 104 may calculate the CIS metric based on network routing information stored in its internal cache. As another non-limiting example, the CIS metric may be calculated from values of an internal data structure.

In some embodiments, different internal values may be used to calculate the CIS metric for different modules within the container 104. That is, in some embodiments, each module within the current container 104 may determine a respective combination of internal state values that are most relevant to that module's operation, and may calculate a respective CIS metric based on that respective combination of internal state values. Thus, in some embodiments, a unique CIS metric may be calculated for each module within a container. In some embodiments, different mechanisms (e.g., different cryptographic hash functions) may be used to calculate the different CIS metrics for different modules.

In some embodiments, the request 108 from the new container 106 may include a timestamp indicating a time at which the current container is to calculate the internal state information. The timestamp may indicate a future time. Thus, the current container 106 may determine the set of internal values at the future timestamp and calculate the CIS metric based thereon. In some embodiments, the current container 104 may publish the calculated CIS metric such that the new container 106 receives the calculated metric via the state database 102. In other embodiments, the current container 104 may communicate the calculated metric to the new container 106 directly. If the current container 104 calculates multiple CIS metrics with respect to multiple modules, it may publish/send the multiple CIS metrics to the new container 106.

In some embodiments, the current container 104 may use state information (e.g., a set of internal values) stored in an internal cache of the container 104 (e.g., internal cache 206) to calculate the CIS metric. In this manner, the current container 104 may determine the CIS metric more quickly—via the faster internal cache lookup—than by accessing the state database 102. In some embodiments, a container may periodically sync its internal cache with state information stored in the state database 102 to ensure that the most up-to-date state information is stored in the internal cache. In some embodiments, the internal cache of the current container 104 may not have been synced with the state database 102, in which case, a cache miss may occur when the current container 104 attempts to retrieve the internal values from the internal cache, and the current container 104 may retrieve the state information from the state database 102 instead. In other embodiments, at block 312, the current container 104 may verify the CIS metric calculated based on the state information stored in the internal cache against a CIS metric calculated exclusively based on state information retrieved from the state database 102. If there is a mismatch, the current container 104 may publish the CIS metric calculated based on the state information retrieved from the state database 102. In other embodiments, the current container 104 may calculate the CIS metric based on a combination of state information stored in its internal cache and state information stored in the state database 102. In still other embodiments, the current container 104 may bypass the internal cache entirely, and calculate the CIS metric based on state values stored in the state database 102.

Referring now to FIG. 3 in conjunction with FIG. 1B, at block 314, machine-executable instructions may be executed by the processor(s) 302 to cause the new container 106 to compare 112 the received CIS metric calculated by the current container 104 to a CIS metric independently calculated by the new container 106. In some embodiments, the new container 106 may independently calculate its own CIS metric at the same future timestamp that the current container 104 performed its calculation. Further, similar to the current container 104, the new container 106 may calculate its CIS metric from state information stored in its internal cache, state information stored in the state database 102, and/or a combination thereof.

In some embodiments, if the new container 106 determines that the CIS metric calculated by the current container 104 matches the CIS metric independently calculated by the new container 106 at the same timestamp, the new container 106 may be confident that its state accurately matches the current state of the current container 104 and may decide to move forward with the container upgrade process by initiating a hand-off from the current container 104 to the new container 106. In other embodiments, the new container 106 may perform the comparison 112 at block 314 multiple times, and may not proceed with the container hand-off until it determines, at least a threshold number of times (e.g., a threshold number of consecutive times), that the CIS metric calculated by the current container 104 matches the one independently calculated by the new container 106. In some embodiments, rather than performing the comparison 112 until a predetermined threshold number of matches occur, the new container 106 may dynamically determine whether to perform an additional comparison between internal values used to calculate the CIS metric, the state of the current container 104, or the like.

In some embodiments, the new container 106 may resend the request 108 for the current container 104 to calculate the CIS metric if more than a threshold amount of time elapses between when the new container 106 sent the initial request 108 and when the current container 104 responded with the calculated CIS metric (either directly to the new container 106 or via a third party such as the state database 102). Further, in some embodiments, the current container 104 may ignore an initial request 108 from the new container 106 for the internal state information, and then proceed to enter a special upgrade state in preparation for the next CIS request from the new container 106.

As described herein, in some embodiments of the disclosed technology, the new container 106 that will replace the old (current) container 104 initiates the container upgrade process by sending the request 108 for the internal state information to the current container 104, which then responds thereto with the calculated CIS metric. It should be appreciated, however, it in some embodiments, the current container 104 may, in fact, initiate the process. That is, the current container 104 may send a request to the new container 106 (directly or via the state database 102) for the new container 106 to calculate its state at a future timestamp. Upon receipt of the CIS metric from the new container 106 (directly or via the state database 102), the current container 104 may then compare the received metric to a CIS metric independently calculated by the current container 104 at the same timestamp. If the metrics match, and optionally, additional matching criteria (e.g., a threshold number of consecutive matches occur) are satisfied, the current container 104 may notify the new container 106 that it is permitted to initiate the hand-off by sending a hand-off request to the current container 104. Alternatively, the current container 104 itself may initiate the hand-off by sending the hand-off request to the new container 106.

Still referring to FIG. 3 in conjunction with FIG. 1B, at block 316, machine-executable instructions may be executed by the processor(s) 302 to cause the new container 106 to send a hand-off request 114 to the current container 104. Similar to other messaging described herein between the containers 104, 106, the new container 106 may send the hand-off request 114 directly to the old container 104 or via publication to a third party such as the state database 102.

Upon the current container 104 receiving the hand-off request 114, machine-executable instructions may be executed by the processor(s) 302 at block 318 to cause the current container 104 to send an acknowledgement message 116 to the new container 106. The current container 104 may send the acknowledgement message 116 directly to the new container 106 or publish it via the state database 102. In some embodiments, upon sending the acknowledgement 116, the current container 104 may cease writing to the state database 102 (i.e., cease updating state information in the state database 102), at block 316.

At block 320, machine-executable instructions may be executed by the processor(s) 302 to cause the new container 106 to initiate writing to the state database 102 upon receipt of the acknowledgement message 116 from the current container 104. In some embodiments, if the new container 106 does not receive the acknowledgement message 116 from the old container 104 within a threshold period of time, the new container 106 may monitor the state database 102 to determine if the state information has been updated since the new container 106 sent the hand-off request. If no updates were made, the new container 106 may determine that the old container 104 is no longer operational, and the new container 106 may take over and begin writing to the state database 102. Alternatively, in other embodiments, the new container 106 may resend the hand-off request 114 if the acknowledgement message 116 is not received within a threshold period of time.

At block 322, machine-executable instructions may be executed by the processor(s) 302 to cause the old container 104 to be removed from the system. At this stage, the new container 106 is now the current container 106, and the old container 104 can be removed from the system without service interruption. Further, at this stage, the now current container 106 can be confident that it is operating with the correct state information.

Figure 4:
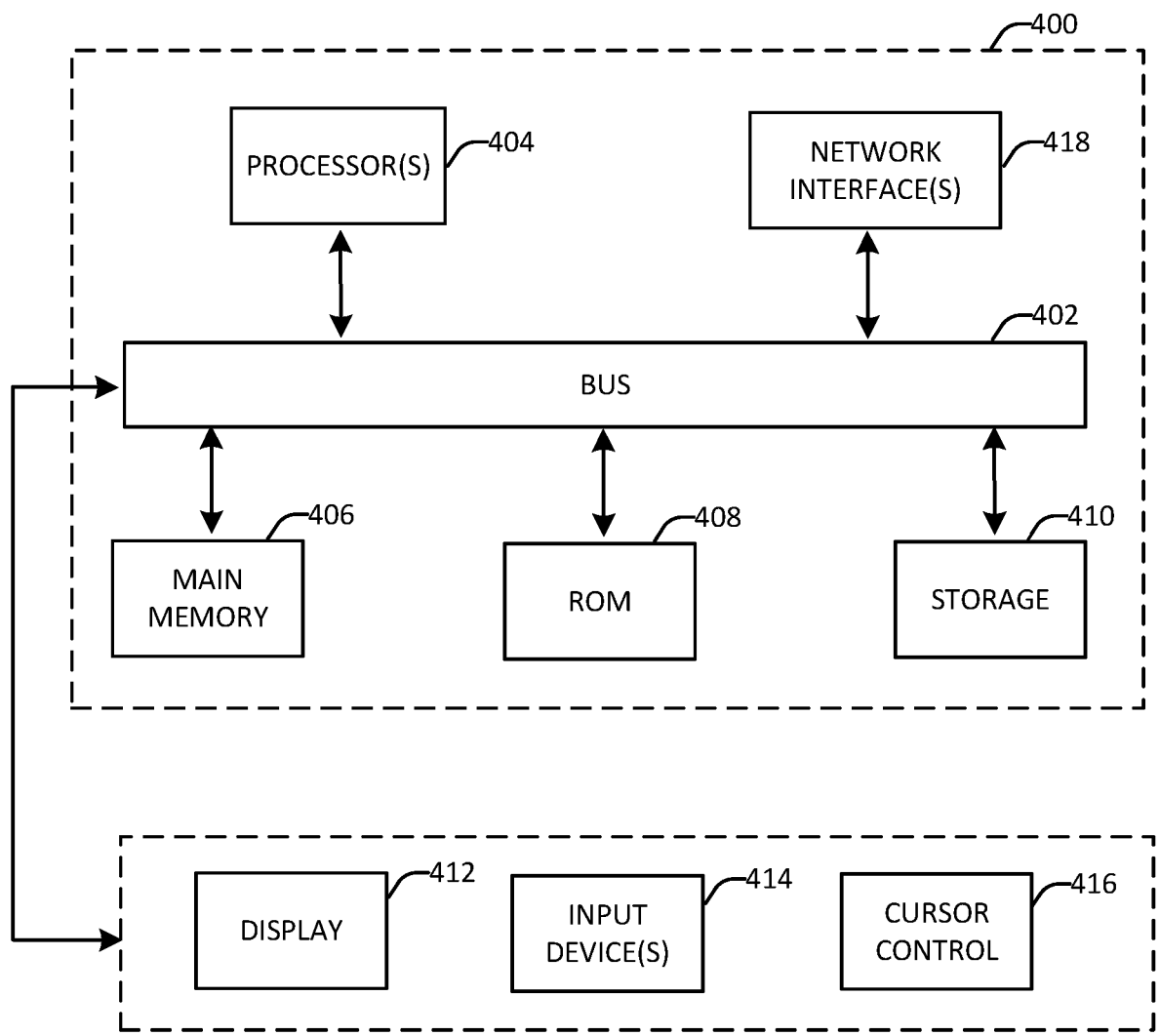
FIG. 4 is an example computing component that may be used to implement various features of example embodiments of the disclosed technology.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, JAVA®, C or C++. A software component may be compiled and linked into an executable program, installed in a dynamic link library, or may be written in an interpreted programming language such as, for example, BASIC, Perl, or PYTHON® (Python Software Foundation). It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for performing a hitless container upgrade from a first container to a second container, the method comprising:
   instantiating the second container;
   obtaining a first state value indicative of a first internal state of the first container at a designated timestamp by sending a message from the second container to the first container indirectly via a third party requesting that the first container calculate the first state value, wherein the message specifies the designated timestamp as a future timestamp at which the first container is to calculate the first state value;
   independently calculating, by the second container, a second state value indicative of a second internal state of the second container at the designated timestamp;
   determining that the first state value matches the second state value; and
   initiating a handoff from the first container to the second container responsive to determining that the first state value matches the second state value.

2. The method of claim 1, wherein instantiating the second container comprises installing the second container in a same system in which the first container is currently running.

3. The method of claim 2, wherein after instantiating the second container, and prior to completing the handoff, the first container has read and write access to a state data store storing state information associated with the system and the second container has read-only access to the state data store.

4. The method of claim 1, wherein the first state value is a first hash of a first set of values representing the internal state of the first container at the designated timestamp and the second state value is a second hash of a second set of values representing the internal state of the second container at the designated timestamp.

5. The method of claim 4, wherein the first set of values is stored in an internal cache within the first container.

6. The method of claim 4, wherein the first set of values comprises one or more static values.

7. The method of claim 1, wherein the designated timestamp is a second timestamp, the method further comprising:
   determining that a third state value calculated by the first container at a first timestamp prior to the second timestamp does not match a fourth state value calculated by the second container at the first timestamp; and
   requesting that the first container recalculate a state value indicative of an internal state of the first container after a period of time has elapsed since the first timestamp.

8. The method of claim 7, further comprising:
   receiving, by the second container, an acknowledgement of the handoff request from the first container; and
   updating, by the second container, state information stored in a state data store.

9. The method of claim 8, wherein the first container comprises a module and the second container comprises an upgraded module including one or more updates to the module, and wherein updating the state information stored in the state data store comprises updating a stored state of the module based on a state of the upgraded module.

10. The method of claim 8, wherein the first container ceases writing to the state data store after sending the acknowledgement of the handoff request.

11. The method of claim 8, further comprising:
    determining that the handoff is complete based at least in part on receipt, by the second container, of the acknowledgement of the handoff request; and
    removing the first container responsive to determining that the handoff is complete.

12. The method of claim 1, wherein initiating the handoff comprises sending, by the second container, a handoff request to the first container.

13. The method of claim 1, wherein first state information indicative of the first internal state and second state information indicative of the second internal state are stored in a state data store that is external to the first container and the second container.

14. A system for performing a hitless container upgrade from a first container to a second container, the system, comprising:
    a memory storing machine-executable instructions; and
    a processor configured to access the memory and execute the machine-executable instructions to:

determine a first internal state of the first container at a particular timestamp by having a message sent from the second container to the first container indirectly via a third party requesting that the first container calculate the first state value, wherein the message specifies the particular timestamp as a future timestamp at which the first container is to calculate a first state value representing the first internal state;

determine, independently of the first internal state, a second internal state of the second container at the particular timestamp;

determine that the first internal state and the second internal state match; and initiate a handoff from the first container to the second container responsive to determining that the first internal state and the second internal state match.

15. The system of claim 14, wherein the at least one processor is further configured to execute the computer-executable instructions to:

instantiate the second container by installing the second container in a same system in which the first container is currently running.

16. The system of claim 14, wherein a first state value is a hash of a first set of values internal to the first container, and wherein the first set of values is stored in an internal cache of the first container or an internal data structure of the first container.

17. The system of claim 14, wherein the first container comprises a module and the second container comprises an updated version of the module, and wherein the at least one processor is further configured to execute the computer-executable instructions to:

read state information from a data store external to the first container and the second container, the state information indicative of an internal state of the module, wherein the internal state of the module was written to the data store by the first container;

initiate event processing by the second container based on the state information;

calculate a current internal state of the module based on the event processing;

read updated state information from the data store, the updated state information indicative of an updated internal state of the module, wherein the updated internal state of the module was written to the data store by the first container;

compare the updated internal state of the module read from the data store to the current internal state; and determine whether to instruct the first container to calculate the first internal state based on the comparison of the updated internal state of the module read from the data store to the current internal state.

18. A computer program product for performing a hitless container upgrade from a first container to a second container, the computer program product comprising a non-transitory computer readable medium storing program instructions that, when executed by a processor, cause operations to be performed comprising:

determining that a first state value calculated by the first container at a first timestamp does not match a second state value calculated by the second container at the first timestamp;

requesting that the first container recalculate a state value indicative of an internal state of the first container after a period of time has elapsed since the first timestamp;

requesting that the first container determine a third state value indicative of a first internal state of the first container at a particular time after the first timestamp by sending a message sent from the second container to the first container indirectly via a third party requesting that the first container calculate the third state value, wherein the message specifies the particular time as a future timestamp after the first timestamp at which the first container is to calculate the third state value;

independently determining, by the second container, a fourth state value indicative of a second internal state of the second container at the particular time;

determining that the third state value matches the fourth state value; and initiating a handoff from the first container to the second container responsive to determining that the third state value matches the fourth state value.

* * * * *